Dec. 12, 1944.   J. DUGAN   2,364,624
RADIO CONTROLLED STEERING SYSTEM
Filed Oct. 17, 1940   4 Sheets-Sheet 1
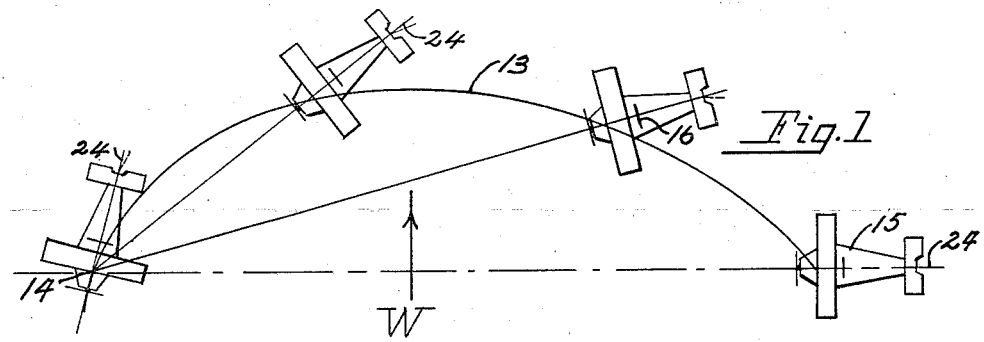
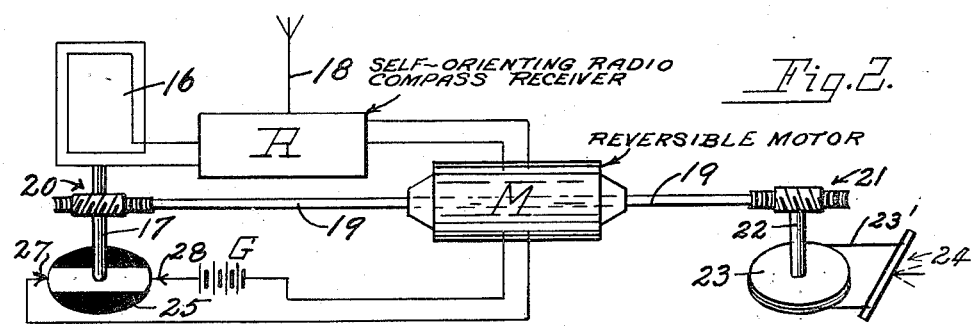
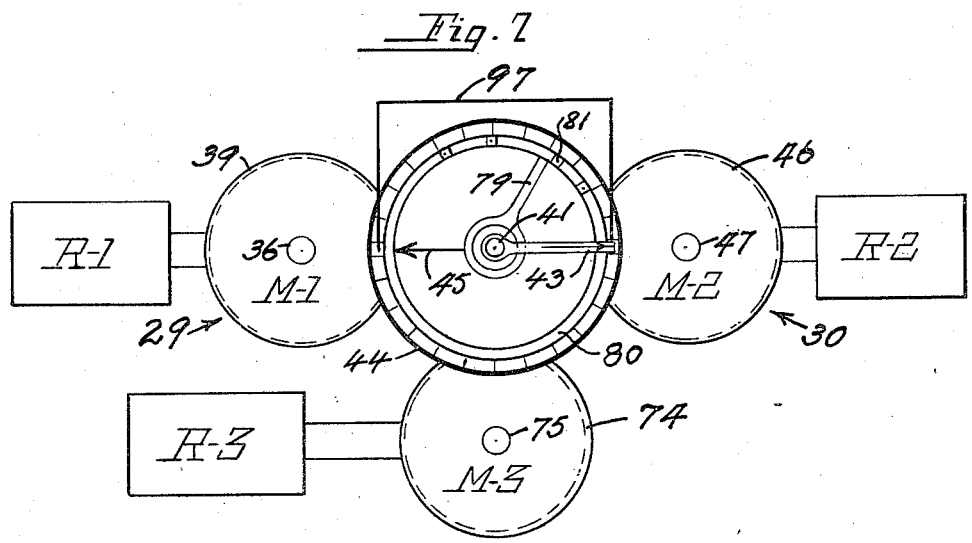
Inventor:
Joseph Dugan.

Dec. 12, 1944.   J. DUGAN   2,364,624
RADIO CONTROLLED STEERING SYSTEM
Filed Oct. 17, 1940   4 Sheets-Sheet 2
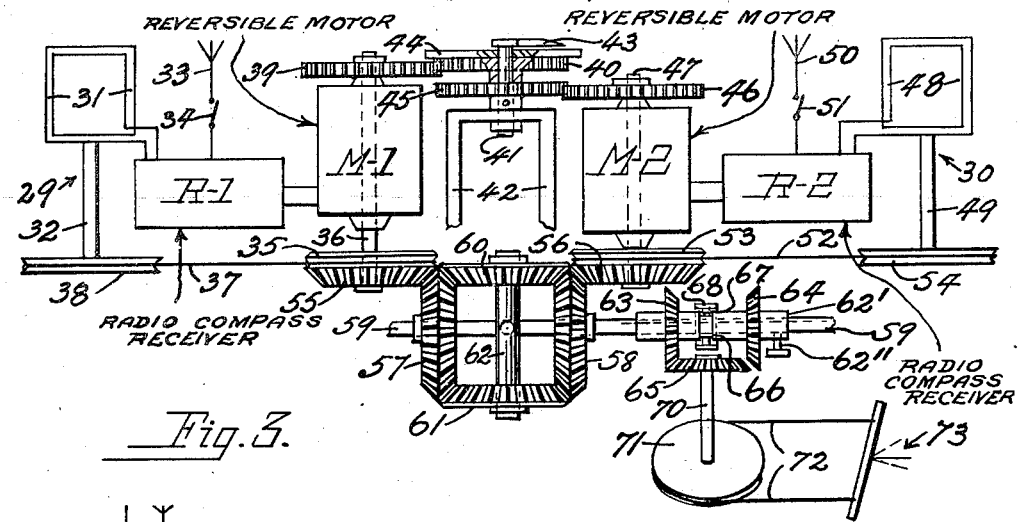
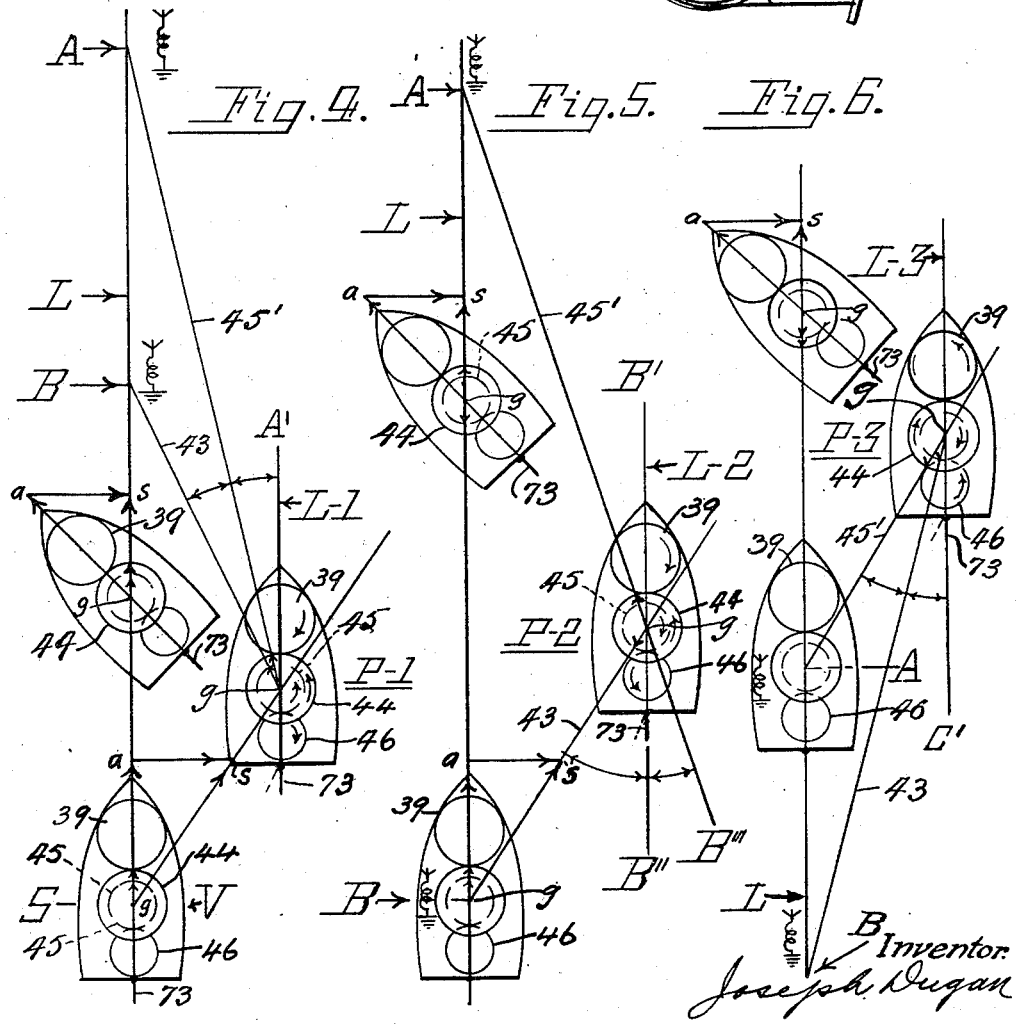
Inventor
Joseph Dugan

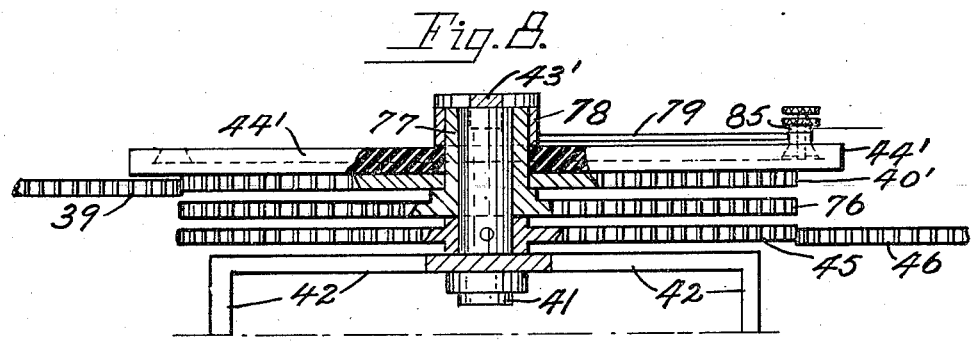
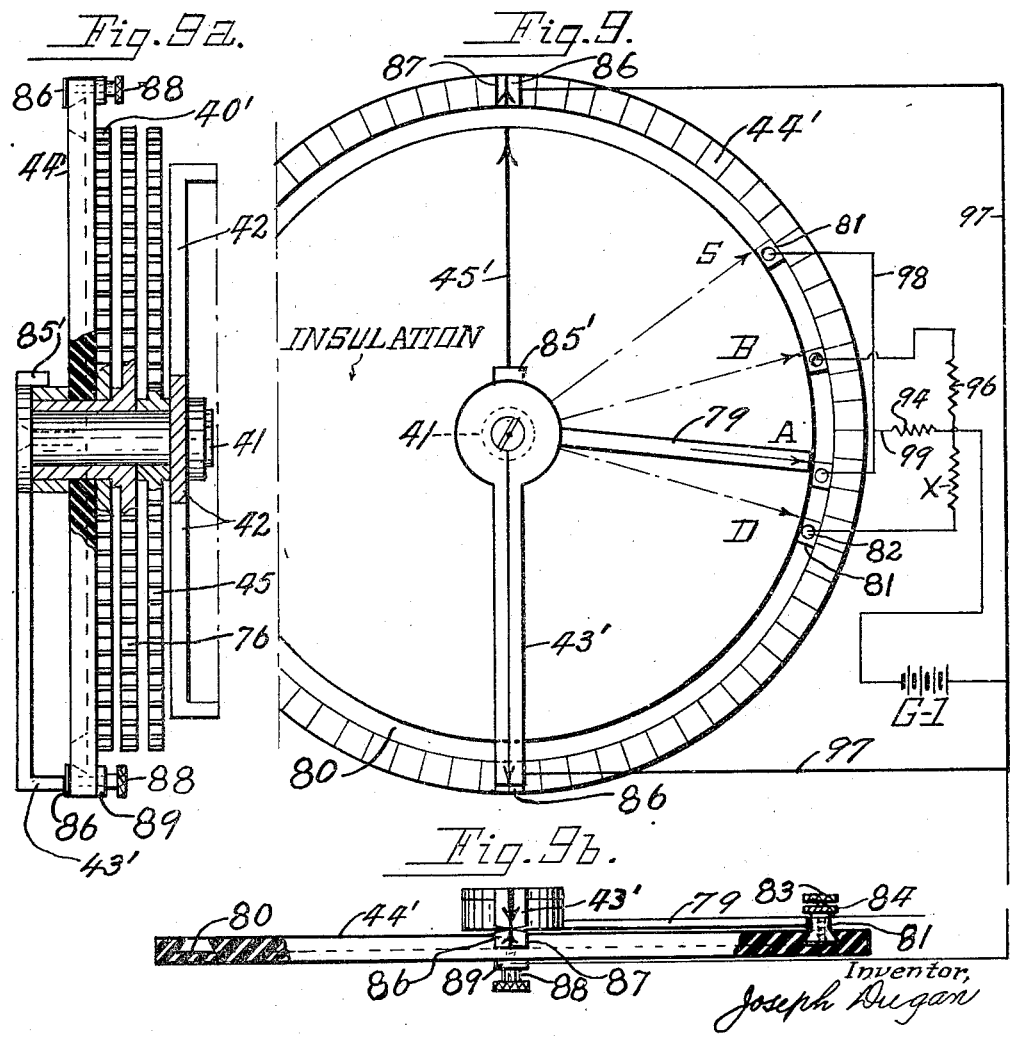

Dec. 12, 1944.    J. DUGAN    2,364,624
RADIO CONTROLLED STEERING SYSTEM
Filed Oct. 17, 1940    4 Sheets-Sheet 4
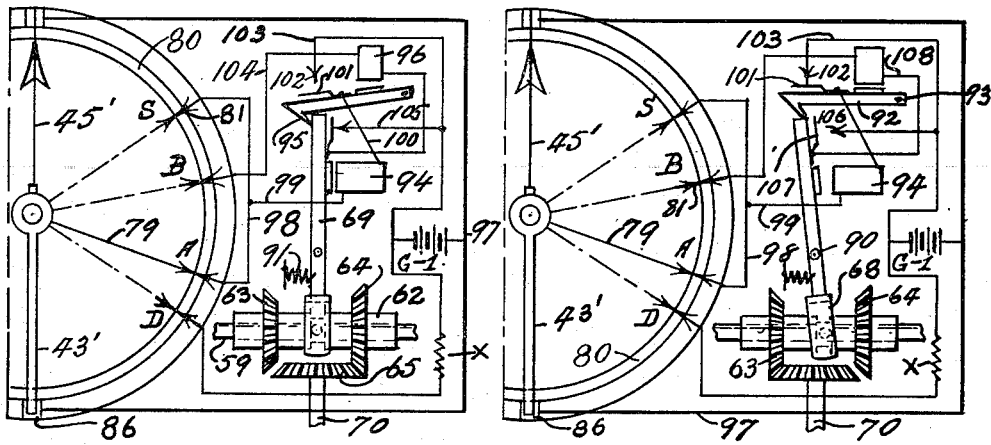
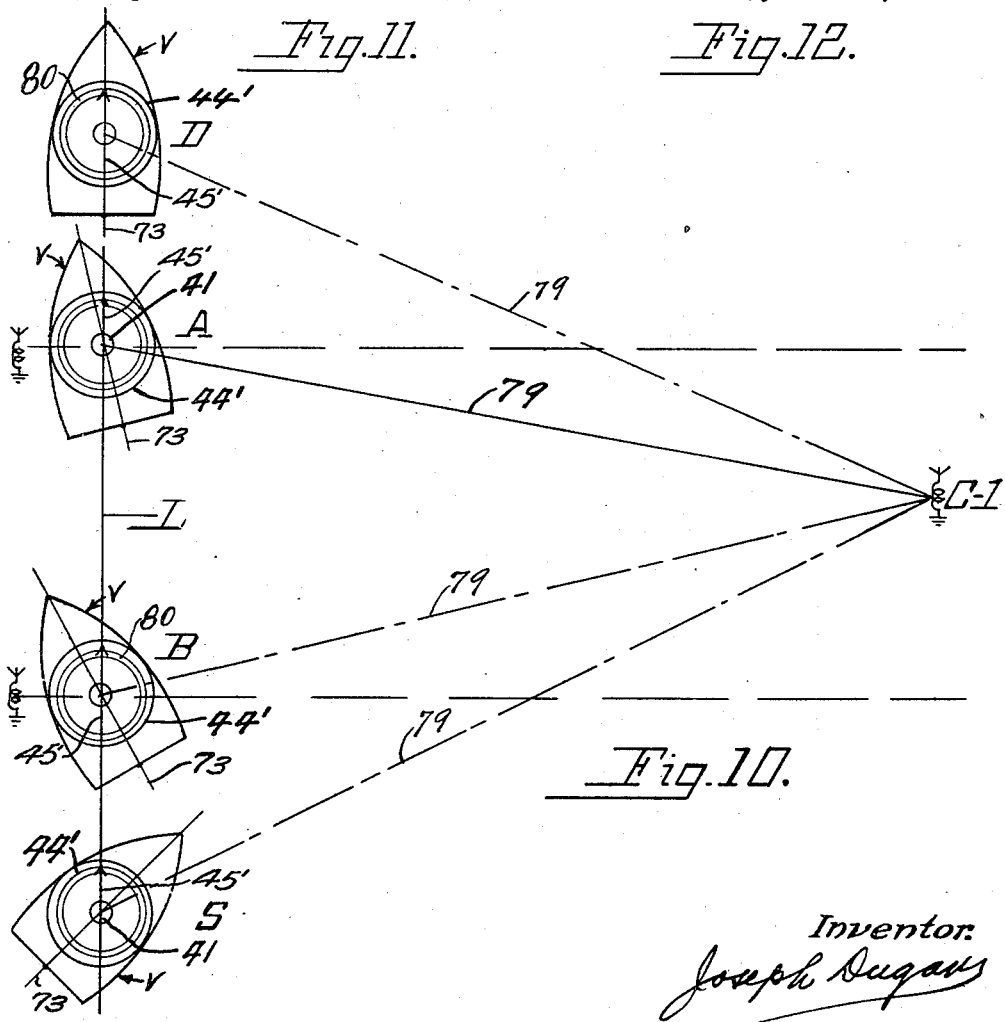
Inventor
Joseph Dugan Patented Dec. 12, 1944

2,364,624

UNITED STATES PATENT OFFICE 2,364,624

RADIO CONTROLLED STEERING SYSTEM

Joseph Dugan, Los Angeles, Calif., assignor of one-half to Evelyn R. Dugan, Los Angeles, Calif.

Application October 17, 1940, Serial No. 361,639
In Canada October 10, 1940

14 Claims. (Cl. 250—2)

In its broadest aspect, this invention relates to a system in which two direction determining devices are mounted on a mobile craft to rotate independently about a normally vertical axis and are operably connected to mechanism for steering the craft, from any location in space, onto and in drift-corrected movement in a predetermined direction along a straight course passing through two spaced apart objects upon which said direction determining devices are separately held trained. In a more limited sense, the invention relates to a system in which radiant energy, emitted in all directions from two spaced apart transmitters of different frequencies, is utilized to control steering equipment on mobile craft for the purpose of automatically steering such craft, from any location in space and regardless of the heading of the craft onto and in drift-corrected movement in a predetermined direction along a straight course passing through said two transmitters.

An important object of the invention is to provide a system in which a single radio transmitter, emitting radiant energy in all directions, may be utilized to control steering equipment, including an automatic radio compass, on mobile craft for the purpose of automatically steering such craft in any and all directions to said transmitter.

The main object of the invention is to provide a system in which mobile craft may be steered automatically, from any location, onto and in drift-corrected movement in a predetermined direction along a straight course passing through any selected two of three transmitters of different frequencies emitting radiant energy in all directions and spaced apart from each other at known distances to form a triangle, the radiant energy of the third transmitter being used to control the operation of means on the craft for continuously indicating the position of the craft on the selected course.

A further object of the invention is to provide a system of the character described in which any desired number of circuit-controlling switches may be set for operation at any predetermined position or positions of the craft on the selected course.

The invention is an improvement on the Radio direction and position indicating system disclosed in my U. S. Patent No. 1,959,264, granted May 15, 1934. Otherwise, the invention is radically new, since there are no prior systems controlled by radiant energy only for steering mobile craft automatically, from any location in space, onto and in drift-corrected movement in a predetermined direction along a straight course passing through two spaced apart transmitters of different frequencies, nor for automatically controlling, by means of steering equipment including automatic radio compasses, the movement of such craft, in any number and from all directions, toward a single broadcasting transmitter.

So far as the automatic steering of mobile craft toward a single broadcasting transmitter is concerned, the inventive idea resides in the use of a self-orienting radio compass to control the rudder mechanism of the craft and automatically steer the craft toward any transmitter emitting radiant energy at a frequency to which the compass may be tuned.

For proper understanding of the principle involved in the automatic steering of mobile craft, from any location in space, onto and in drift-corrected movement in a predetermined direction along a straight course passing through two spaced apart points, it will be necessary to consider the space on opposite sides of said course as divided into three zones by planes perpendicular to said course at the separated points, as suggested in Fig. 10. In the intermediate zone the craft will move between the two separated points. In one of the outer zones, the craft will move toward both points; and, in the other outer zone, the craft will be considered as moving away from both points.

With this division into zones understood, the principle involved, and as illustrated in Figs. 4, 5 and 6, requires:

(1) that when the craft is in drift-corrected movement along the desired straight-line course, the rudder of the craft must be zero-centered (alined with the fore-and-aft axis); (2) that, regardless of the headings of the craft, when it is located in either of the outer zones and is laterally displaced to the right of said course (looking along the course in the desired direction of movement), the rudder must be continuously adjusted clockwise from zero-center through angles proportional to the continuously varying differences between the exterior and interior-opposite angles at the fixed base of the triangles formed by drawing straight lines to the laterally displaced craft from the said two spaced apart points; (3) that, regardless of the headings of the craft, when it is located in the intermediate zone and is laterally displaced to the right of said course, the rudder must be adjusted continuously clockwise from zero-center through angles proportional to the continuously varying sums of the interior angles at the fixed base of the triangles formed by straight lines drawn from the said spaced apart points to the laterally displaced craft.

The same principle is involved in the continuously varying adjustments of the rudder when the craft is located to the left of the desired course; except that in this event, the rudder must be adjusted counter-clockwise, instead of clockwise, from zero center.

The matter of determining and indicating the position of the craft during its movements along a straight course passing through two separated radio transmitters is suggested in my aforesaid U. S. Patent 1,959,264 and involves the idea of continuously orienting a base plate or dial to maintain a reference line on the dial alined with said course. With a dial oriented in this manner, the continuous determination and indication of the position of the craft on its drift-corrected course may be carried out, as disclosed herein, by setting up on said dial a representation in miniature of the angles formed with said course by a straight line drawn from the craft, as it proceeds along the course, to a third transmitter located on either side of said course, and by causing an indicator or arm to rotate, under control of energy derived from said transmitter, through the same angles over this miniature representation and indicate, on a suitably calibrated scale, the position of the craft on its said course.

Other objects and advantages of the invention will become apparent as the detailed description thereof proceeds.

In the drawings:

Figs. 1 and 2 are diagrams illustrating one form of the invention and its mode of operation in steering mobile craft automatically from any and all directions toward a broadcasting radio transmitter;

Fig. 3 is a diagrammatic layout of the apparatus used for steering mobile craft, from any location, onto and in drift-corrected movement in a predetermined direction along a straight course passing through two spaced apart points or objects;

Figs. 4, 5 and 6 are diagrams used to explain the underlying principle involved in the operation of the drift-correcting steering mechanism disclosed in Fig. 3;

Fig. 7 is a diagram illustrating a suitable arrangement of three radio receivers and inter-connecting mechanism for steering mobile craft automatically along a straight course, and for continuously indicating the position of the craft on said course;

Fig. 8 is a fragmentary side elevation, to an enlarged scale, with parts broken away and shown in section, of mechanism operated by the three receivers shown in Fig. 7 to control the drift-corrected steering of the craft and the operation of switch controlled circuits at any predetermined point or points on the course;

Fig. 9 is a top plan of the major part of a control dial or base plate forming one of the essential elements of the system;

Fig. 9a is a side elevation, with parts broken away and shown in section, of the aforesaid control dial and the gearing directly below it;

Fig. 9b is an end elevation, with parts broken away and shown in section, of the control dial shown in Fig. 9;

Fig. 10 is an explanatory diagram, illustrating the method of determining the position of the craft on its course; and Figs. 11 and 12 are diagrams illustrating the automatic operation of a latch switch used to control the operation of a rudder control clutch as the craft passes over the controlling transmitters.

Referring now to Figs. 1 and 2 of the drawings, the curve designated by the reference numeral 13 represents roughly the path toward and across a radio transmitter 14 traversed by a mobile craft 15 subjected to a side wind W and equipped with steering mechanism automatically controlled by a self-orienting radio compass including a receiver R tuned to the frequency of the transmitter 14. These automatic or self-orienting radio compasses are now well known and have been in common use for several years. They are shown and described in detail on pages 250 to 257, inclusive, and pages 305, 306 and 307 of Aircraft Radio and Electrical Equipment, by Howard K. Morgan, published in 1939 by Pitman Publishing Company, New York and Chicago; and are fully disclosed in the British patents to Sperry Gyroscope Company, Inc., Nos. 523,093 and 523,953, accepted July 14 and 26, 1940, respectively, and in the German patent to Dieckmann No. 555,826—1932.

Preferably, the receiver R includes a loop antenna 16, mounted on a shaft for rotation about a normally vertical axis on the craft, and a sense antenna 18 connected to the amplifying mechanism of the receiver R in the usual manner. The receiver output controls the operation of the motor M to rotate the loop-supporting shaft 17, through the interconnected worm gearing 20, so as to maintain the loop 16 with its plane constantly perpendicular to the straight lines drawn from the transmitter 14 to the said loop. It will be understood, of course, that this receiver apparatus must be set up initially on the craft with the plane of the loop perpendicular to the fore-and-aft axis and with the rudder of the craft alined with said axis.

The shaft 19 is also connected by worm gearing 21 to rudder shaft 22 having a grooved pulley 23 suitably secured thereto and connected by a cable 23' to the rudder mechanism designated generally by the reference numeral 24. It is evident that the rudder 24 must be rotated in a direction opposite to the direction of rotation of the loop, and that the rudder angle must be proportional to the angles through which the loop is rotated from its initial position relative to the fore-and-aft axis of the craft during its flight toward the transmitter.

As the craft passes over the transmitter, the phase change causes the loop to rotate through an angle of 180 degrees. Advantage may be taken of this reversal to perform some useful function, such as the release of bombs from a rack or stopping the operation of the power plant of the craft to cause it to drop bodily in the vicinity of the transmitter. For example, the loop shaft 17 or the rudder shaft 22 might be provided with any desired number of switches to make or break electric circuits controlling the operation of various mechanisms on the craft. One such switch, shown in Fig. 2, comprises a disk 25 of insulating material having a diametral conducting strip 26 normally in contact with the terminals 27 and 28 of a circuit including the motor M and generator G, which may be considered as the source of energy for the operation of the aforesaid power plant of the craft. This strip 26 should be just wide enough to ensure closure of the circuit during any such lateral or yawing movements as might be expected during the flight of the craft to the transmitter.

It is evident that passage of the craft 15 over the transmitter 14, causing a 180 degree reversal in rotation of the loop shaft 17, will open the circuit through the motor M and any other apparatus included in that circuit. Even if the circuit were not broken upon arrival of the craft at the transmitter, the craft would merely spiral around the transmitter until its power supply became exhausted, or until it were forced down by other means.

The system disclosed in Figs. 3 to 6 of the drawings is designed to steer a craft automatically from any location onto and in drift-corrected movement in either direction along the straight-line course L passing through the two radio transmitters A and B of different frequencies. The steering mechanism mounted on the craft includes two automatic (self-orienting) radio compasses designated generally by the reference numerals 29 and 30, respectively. The compass 29 includes: the receiver R-1, tunable to the frequency of either transmitter; a loop antenna 31 mounted on a shaft 32 for rotation about a normally vertical axis; and a sense antenna 33 connected to the receiver R-1 through a switch 34. The output of receiver R-1 operates the follow-up motor M-1 to effect rotation of the grooved pulley 35 fixed to the lower end of the motor shaft 36. A cable 37 transmits the rotation of the pulley 35 in the reversed direction of shaft 36 to a similar pulley 38 fixed to the loop supporting shaft 32, and thereby maintains the loop 31 with its plane constantly perpendicular to a straight line joining the transmitter A to the receiver R-1. A gear 39, fixed to the other end of shaft 36, meshes with a similar gear 40 mounted to rotate on a shaft 41 which is mounted to rotate independently about its axis on the fixed support 42. A pointer 43 is suitably secured to the upper end of the shaft 41 for rotation over a dial 44 fixed to the gear 40 and provided with a diametral indicating line 46'. (See Figs. 7, 9, 10 and 11.)

The shaft 41 is rotated by means of a gear 45 in mesh with the gear 46 fixed to the upper end of the rotor shaft 47 of the motor M-2 which is operably controlled by the output of the receiver R-2 of the automatic radio compass 30. The receiver R-2 is tunable to the frequency of the transmitter B and includes the loop antenna 48 mounted on the shaft 49 for rotation about a normally vertical axis, a sense antenna 50 being connected to this receiver R-2 through the switch 51. Rotation of the loop-supporting shaft 49 in the reversed direction of the shaft 47 is effected through the cable 52 connecting the grooved pulleys 53 and 54 fixed to the lower ends of the shafts 47 and 49, respectively.

As so far described, the apparatus shown in Fig. 3 is substantially the same as that disclosed in my aforesaid U. S. Patent 1,959,264; and, the corrections for drift of the craft from the course L could be made, as disclosed in said patent, by manually steering the craft to maintain the pointer 43 in alinement with the indicator line 46' on the dial 44. To adapt this apparatus for automatic steering, the lower ends of the motor shafts 36 and 47 have the bevel gears 55 and 56 fixed respectively thereto, and meshing with the adjacent differential gears 57 and 58 rotatably mounted on the shaft 59. These gears 57 and 58 mesh with the bevel gears 60 and 61 on the opposite ends of the differential spider 62 which is pinned to the shaft 59 to complete the differential gear set.

A sleeve 62' is splined on the shaft 59 to slide thereon and rotate therewith. Bevel gears 63 and 64, secured to the sleeve 62', are adapted to be moved thereby alternatively into or out of mesh with one side or the other of the bevel gear 65. The sleeve 62' may be locked by the clamping screw 62" in an intermediate position, with gears 63 and 64 clear of gear 65, to permit manual control of the rudder mechanism when desired. The sleeve 62' has a circumferential groove formed therein to receive the pins 67 extending inwardly from the opposite arms 68 of a yoke formed on one end of a clutch-throw lever 69. (See Figs. 11 and 12.) The gear 65 is fixed to the upper end of a shaft 70 carrying the grooved pulley 71 operably connected by the cable 72 to the rudder 73.

The direction of movement of the clutch sleeve 62' to cause one or the other of the gears 63 or 64 to mesh with the gear 65 depends upon the location of the transmitters A and B relative to the craft as it proceeds in one direction or the other on the course passing through said transmitters. The reasons for this dependence and the necessity for using the differential gearing will appear from consideration of the diagrams shown in Figs. 4, 5 and 6. In these diagrams, the craft is indicated by the reference character V; the solid circle at the bow of the craft represents the gear 39 of the motor M-1; the solid center circle represents the dial 44 which is fixed to the gear 40 in mesh with gear 39; the smaller broken circle at the center represents the gear 45 fixed to the shaft 41 having the pointer 43 secured to its upper end for rotation over the dial 44; and, the smaller circle at the stern represents the gear 46 which is fixed to the rotor shaft 47 of the motor M-2 and imparts rotation to the pointer 43 through the gear 45 and the shaft 41.

Fig. 4 illustrates the craft V as starting in movement toward the transmitter B from a starting point S along a straight course L passing through the transmitters B and A. As initially installed on the craft, the apparatus will be mounted with the line 46' and pointer 43 in alinement with each other and with the fore and aft axis of the craft. At the starting point S, the craft is headed along the course L and is subjected to a side wind *as* which will cause the craft to drift eventually to the position P-1, unless the heading be changed in the meantime. In position P-1, the craft lies to the right of the course L and is headed along the line L-1 parallel to the course L; consequently, the rudder 73 must be moved to the left (clockwise) in order to steer the craft toward said course L.

If in this position P-1 of the craft, the receivers R-1 and R-2 are tuned to the frequencies of the transmitters A and B, respectively, the gear 39 will be rotated clockwise by the motor M-1 through the angle A'gA to impart a counterclockwise rotation through the same angle A'gA to the dial 44 and its indicator line 46' which is represented in Figs. 4, 5 and 6 by the line gA. Similarly, the gear 46 will be rotated clockwise by the motor M-2 through the angle A'gB to impart a counter-clockwise rotation through the same angle A'gB to the pointer 43 which is represented in Figs. 4, 5 and 6 by the line gB.

Clockwise rotation of the gear 46 is obviously accompanied by clockwise rotation of the bevel gears 56 and 58 through the angle A'gB; while clockwise rotation of the gear 39 and its connected gear 55 causes counter-clockwise rotation of the differential gear 57 through the smaller angle A'gA. Obviously, the result is a clockwise rotation of the differential spider 62 and the shaft 59 through A'gB minus the angle A'gA; that is, a clockwise rotation of shaft 59 through the angle AgB which is clearly equal to the difference between the exterior and interior-opposite angles at the base BA of the triangle formed by drawing straight lines from the transmitters A and B to the craft V in its laterally displaced position P-1. Since the rudder 73 must be rotated clockwise to steer the craft toward the line L, it is apparent that the sleeve 62' must be moved to cause engagement of the gears 64 and 65. The proper position of the sleeve 62' to effect steering of the craft toward the line L is shown in Fig. 11. As will be pointed out later, these necessary movements of the sleeve 62' may be effected automatically in this system.

It is obvious that drift of the craft V to the left of the course L, instead of to the right, will call for opposite rotations of the receiver loops, the gears 39 and 46 of the motors M-1 and M-2, and the rudder 73. Therefore, the gears 64 and 65 must remain in mesh while the craft is in movement toward the transmitters A and B on either side of the course L. Obviously, this means that the motors M-1 and M-2 must be reversible.

In order to steer the craft from the position P-1 on to the line L and in drift corrected movement along that line in the direction BA, the rudder 73 must be rotated clockwise through an angle proportional to the angle AgB. Then, when the craft moves toward the line L, the angle AgB becomes smaller and smaller and the rudder angle decreases proportionally; until, finally, the angle AgB vanishes, the lines Ag and Bg coincide; and the craft "crabs" along the course L, headed into the wind as at the drift angle ags under air-speed ga and ground speed gs, with the rudder 73 alined with the fore-and-aft axis. The correction for drift is thus completely automatic, and the track of the craft approaches the desired drift-corrected course L through the transmitters B and A asymptotically.

In Fig. 5, the craft V is shown as starting from the transmitter B toward the transmitter A under a cross wind as and air-speed ga, or headed along the line L. If this heading be maintained, the craft will eventually arrive at the position P-2, with its fore and aft axis lying in the line L-2 parallel to the course line L. With the craft in position P-2, it is evident that the motor M-1 must have rotated the gear 39 clockwise through the angle B'gA to cause counter-clockwise rotation of the dial 44 through the same angle B'gA. It is also evident that the motor M-2 must have rotated the gear 46 counter-clockwise through the angle B''gB to cause clockwise rotation of the pointer 43 through the same angle B''gB. This means that the dial 44 and pointer 43 rotate in opposite directions when the craft is laterally displaced from the course L during its flight between the transmitters B and A.

Counter-clockwise rotation of the motor M-2 and its associated gear 56 causes counter-clockwise rotation of the differential bevel gear 58 and the spider 62; and, clockwise rotation of the motor M-1 and its associated gear 55 causes counter-clockwise rotation of the differential gear 57 and spider 62. This means that the angles B'gA and B''gB are added in the differential to rotate the shaft 59 counter-clockwise through the sum of the angles B'gA and B''gB; or, the angle B'''gB which is obviously equal to the sum of the interior angles at the base BA of the triangle formed by drawing straight lines from the transmitters A and B to the craft in its laterally displaced position P-2. The necessary clockwise adjustment of the rudder 73 through an angle proportional to the angle B'''gB, requires a shift of the sleeve 62' to mesh the gears 63 and 65, as shown in Fig. 3.

In Fig. 6, the craft is shown as headed for movement along the line L away from both transmitters A and B. If this heading be maintained, the craft will eventually arrive at the position P-3 headed along the line L-3 parallel to the line L. If the receivers R-1 and R-2 be now tuned to the frequencies of the transmitters A and B, respectively, the dial 44 and pointer 43 will rotate through the angles C'gA and C'gB, respectively. The necessary counter-clockwise rotation of motor M-1 and its associated gear 55 causes a clockwise rotation of the differential gear 57 and spider 62 through the angle C'gA; while the counter-clockwise rotation of the motor M-2 and its associated gear 56 causes counter-clockwise rotation of the differential gear 58 and spider 62 through the smaller angle C'gB. The differential result is a clockwise rotation of the shaft 59 through the angle C'gA minus the angle C'gB; or, the angle BgA which is clearly equal to the difference between the exterior and interior-opposite angles at the base BA of the triangle formed by drawing straight lines from the transmitters A and B to the craft in its laterally displaced position P-3. In this case, since the shaft 59 rotates clockwise, it will be necessary to shift the sleeve 62' to cause gear 64 to mesh with gear 65 for clockwise adjustment of the rudder 73 through an angle proportional to the angle BgA.

It will be apparent from inspection of Figs. 4, 5 and 6, that the angles formed by the straight lines drawn from the transmitters A and B to the laterally displaced craft, are independent of the headings of the craft. This means that, regardless of the heading of the craft in any of its laterally displaced positions, the automatic pilot will steer the craft from any such position on to and in drift-corrected movement in a predetermined direction along the course L. For example, if the craft in position P-1 were headed in a direction opposite to that shown in Fig. 4, the adjustment of the rudder 73 would still be clockwise and proportional to the angle AgB, and would first cause the craft to swing counter-clockwise and somewhat spirally away from the course L through an angle of 180 degrees; and, thence on a path tending asymptotically toward the course L into drift-corrected movement in the direction BA along that course.

The direction of movement of the craft along the course L, is determined by the tunings of the receivers R-1 and R-2. If the receivers R-1 and R-2 be tuned to the frequencies of the transmitters A and B, respectively, the craft will move in the direction BA. If the receivers R-1 and R-2 are tuned to the frequencies of the transmitters B and A, respectively, the craft will move in the direction AB. The rule is that the direction of movement of the craft along the course L is that direction in which the transmitter to which the receiver R-1 is tuned lies ahead of the transmitter to which the receiver R-2 is tuned.

It is evident that no clutch change would be necessary if the craft were not required to traverse the intermediate zone defined by planes perpendicular to the course L and passing through the transmitters A and B; and, that such change is necessary when the craft moves out of one zone into the adjacent zone. These changes could be made by an operator as the craft passes over a transmitter from one zone into another. However, this system includes means for effecting the necessary changes automatically. To do so, it is necessary to provide the steering apparatus shown in Fig. 3 with some means to determine the position of the craft continuously as it moves along the course L and to operate the clutch automatically as the craft passes from one zone into another.

The complete system requires the use of a third transmitter C-1 and third receiver R-3 arranged on the craft for control by this third transmitter. The arrangement of the three receivers is shown diagrammatically in Fig. 7; and a possible relative arrangement of the three transmitters is shown in Fig. 10.

In Fig. 7, the rectangles R-1 and R-2 and the connected circles M-1 and M-2 and the dial 44' represent the entire mechanism shown in Fig. 3 with a slightly modified dial. The rectangle R-3 and the connected circle M-3 represent a complete self-orienting radio compass similar in every respect to the automatic radio compasses shown in Fig. 3 on opposite sides of the gears 40 and 45. This motor M-3 is used to rotate a third loop (not shown), forming part of the receiver R-3, by means of a grooved pulley arrangement (not shown) similar to the arrangement shown in Fig. 3 for rotating the loops 31 and 48. The motor M-3 is not connected to the differential or rudder controlling mechanism.

In Fig. 7, the broken circles 39 and 46 represent the pitch circles of the gears 39 and 46 which are rotated by the motors M-1 and M-2, respectively. Similarly, the circle 74 represents a gear (not shown elsewhere), similar to the gears 39 and 46, secured to the upper end of the rotor shaft 75 of the motor M-3 to mesh with and rotate the gear 76 which is shown in Fig. 8 as interposed on the shaft 41 between the gears 40' and 45. It is to be understood that this motor M-3 and its connected gear 74 may be located in front or to the rear of the gear structure shown in Fig. 8. and therefore would not appear in this figure. There will be no difficulty in understanding the system if it be kept in mind that the gear 76 of Fig. 8 is rotated by the gear 74 of motor M-3 in exactly the same manner as gears 40 and 45 are rotated by the gears 39 and 46, respectively.

Referring now to Figs. 8, 9, 9a and 9b, the gear 45, similar to the gear 45 of Fig. 3, is fixed to the shaft 41 and meshes with the gear 46 of motor M-2 to cause rotation of said shaft on its fixed support 42. The gear 76, rotated by the gear 74 of motor M-3, rotates on said shaft 41 and has a sleeve 77 extending upwardly along shaft 41 to form a bearing for the gear 40' which takes the place of the gear 40 of Fig. 3. The dial 44' of insulating material is suitably fixed to the gear 40' and has its upper face graduated angularly and calibrated to represent distances traversed by the craft along the course L. The sleeve 77 extends above the graduated face of the dial 44' to receive the collar 78 having an arm 79 of conducting material extending radially over the dial 44'. This collar 78 is fixed to the sleeve 77 and is therefore rotated by the motor M-3 through the gear 76 to point continuously to the third transmitter C-1.

The dial 44' is provided with a circular groove 80 of dovetail cross-section to receive adjustably any desired number of conducting contact members 81 adapted to be clamped in any position of angular adjustment in the groove 80. Each member 81 is dovetailed to fit the groove 80 and has a screwthreaded bore 82 extending therethrough to receive a clamping screw 83 adapted to contact with the bottom of groove 80 and force the member 81 upwardly into clamped contact against the the inwardly inclined sides of the groove. The shank of the screw 83 is threaded throughout its length to receive a nut 84 adapted to clamp a contact terminal 85 against the upper end of member 81. The arm 79 is just long enough to make wiping contact with each member 81 as it rotates over the dial 44'.

A conducting pointer 43', corresponding to pointer 43, is fixed to the top of shaft 41 and is provided with a contact tab 85' in wiping contact with the collar 78. The outer end of the pointer 43' is bent downwardly to clear the members 81 and making wiping contact with the members 86 in the form of conducting blocks inserted in the dial 44' at diametrically opposite ends of the indicator line 45' on said dial. The conducting blocks 86 are of slightly greater width than the contact members 81, and are detachably seated in grooves 87 cut to the same depth as the groove 80 so as to permit the ready insertion and removal of members 81 into and from the groove 80. Clamping screws 88 pass through suitable apertures in the dial 44' to secure the blocks 86 detachably in position on said dial, and are shouldered for the purpose of clamping contact terminals 89 against the lower face of said dial.

As illustrated in Figs. 9, 11 and 12, four of these contact members 81 are clamped in adjusted positions on the dial 44', corresponding to the positions of the craft V, in Fig. 10, as it moves along the course L through the points S, B, A and D, successively. From inspection of Fig. 10, it is evident that as the craft moves along the course through points S, B, A and D, the line joining the transmitter C-1 to the axis of the shaft 41 appears to rotate clockwise around the dial 44'. Therefore, in setting contact members 81 on the dial 44' to represent the locations of the points S, B, A and D on the course L, it will be necessary to set them so that the lines joining them to the center of the dial 44' are at the same angles to the indicator line 45' as the corresponding lines C-1S, C-1B, C-1A and C-1D occupy in Fig. 10 relative to the line L. In other words, the elements 81 are arranged on the dial so as to reproduce in miniature the conditions in space represented in Fig. 10, since the indicator line 45' is maintained coincident with the line L during the drift corrected movements of the craft along line L.

Figs. 11 and 12 show a latch switch operated by wiping contact of the arm 79 with the members 81 on the dial 44' as the arm is rotated under the control of the transmitter C-1. This latch switch controls the operation of the clutch-throw lever 66 having the pins 67 extending inwardly from the yoke arms 68 into the circumferential groove 66 of the clutch sleeve 62' (see Fig. 3). The lever 69 rocks about the pivot 90, and is normally held by the compression spring 91 in the released position shown in Figure 12, with the clutch gear 63 in mesh with the rudder control gear 65. A latch 92 for this lever 69 is pivoted to rotate about the pivot 93 and has its free end normally resting in release position on the upper end of lever 69.

An electro-magnet 94 is adapted, when energized, to attract the upper arm of lever 69 so as to allow the hook end 95 of the latch 92 to drop over the end of said lever and hold it in the locked position shown in Fig. 11, with the clutch sleeve 62' moved to mesh gear 64 with gear 65. Another electromagnet 96 is mounted above the latch 92 and is adapted, when energized, to raise the latch from its lever-locking position and allow the spring 91 to return the lever 69 and gear 63 to the released position shown in Fig. 12.

To ensure closure of the circuits through the contact members 81 only when the pointer 43' is alined with the line 45' on the dial 44', the contact blocks 86 are connected by a common wire to the positive terminal of the battery G-1. The members 81 at the points S and A are connected by a wire 98 through a wire 99 to one terminal of the magnet 94, the other terminal of which is connected by a wire 100 to the spring contact plate 101 fixed to the latch 92 near the hook end thereof. The return to the battery G-1 is completed by the contact 102 and the ground wire 103, only when the arm 79 is in contact with either of the members 81 at the points S or A on the dial 44', and only when the free end of pointer 43' is in contact with one or the other of the blocks 86 at the opposite ends of the indicator line 45'. As soon as the magnet 94 becomes energized, the lever 69 moves from the released position of Fig. 12 into the locked position shown in Fig. 11, and the circuit through the magnet breaks by separation of the contacts 101 and 102. A wire 104 connects the member 81 at point B on the dial 44' to one terminal of the release magnet 96, the other terminal of which is grounded through wire 105, contact 106, spring contact 107 on lever 69, and the wire 108.

The lever 69 normally occupies the released position shown in Fig. 12; and, as the craft moves along the course L, the lever is moved automatically into locked position as it passes the point S, released as it passes the point B, locked again as it passes over the transmitter A toward the destination D. These successive operations are clearly indicated in Figs. 11 and 12. When the craft is intended to be steered automatically over the transmitters B and A, the sense antennas 33 and 50 should be disconnected to prevent reversal of the loops. The 180 degree ambiguities can have no effect on the operation of the system, since the automatic adjustments prevent the craft from moving on to any course except the course on which the transmitters actually lie. The sense antenna of the receiver R-3 maintains the arm 79 constantly pointing to the transmitter C-1 and on the proper side of the indicator line 45' on the dial 44'.

Any desired number of contact members 81 may be arranged on the dial 44' to control the performance of any corresponding number of functions at predetermined points along the course. For example, the member 81 shown at the point D in Figs. 9, 11 and 12 may be used to close a circuit controlling the release of bombs from a rack, to stop the power plant of the craft, or explode its contents upon arrival at the point D on the course L. The apparatus which might be controlled by the member 81 at the point D is represented in Figs. 9, 11 and 12 as a resistance having the reference character X applied thereto. The magnets of Figs. 11 and 12 are represented in Fig. 9 by resistances having the corresponding numerals 94 and 96 applied thereto, respectively.

It is obvious that either of the two automatic radio compasses 29 or 30 may be used alone to effect the steering of a craft automatically toward a single transmitter in the manner indicated in Fig. 1 of the drawings; that both compasses must be used to steer the craft from any location on to and in drift-corrected movement in a predetermined direction along a straight course through the spaced apart transmitters; and, that all three compasses must be used when it is desired to determine the position of the craft on its course, or perform certain operations automatically at selected points along said course.

The greatest utility of the invention probably lies in its use under the supervision of human pilots. For example, a pilot desiring to determine the position of his craft in space can obtain a "fix" in a few seconds by tuning the three receivers to the frequencies of three broadcasting transmitters spaced apart triangularly at known distances from each other. With the sense antennas connected to their respective receivers, the direction of the craft from the three transmitters is at once indicated on the dial 44'. If the pilot should then desire to move his craft on to and in a predetermined direction along a straight course passing through any two of said three transmitters, he may secure this result by tuning the receivers R-1 and R-2 to the frequencies of the two transmitters lying on the course desired and by setting the rudder clutch in accordance with the zone in which the craft happens to be located. The craft will then be steered automatically, and regardless of its initial heading, on to and in drift corrected movement in the desired direction along the selected course.

It is not necessary that either of the transmitters A or B be fixed in order to control the movements of a craft equipped with the automatic steering mechanism disclosed herein. Obviously, one transmitter might be fixed ashore, while the other might be mounted on a vessel movable in all directions off-shore to control the lateral movements of a second (pilotless) vessel toward a visible target which might also be in movement. It is also obvious that both transmitters might be movable without affecting their ability to control the movements of a pilotless craft equipped with this steering mechanism.

The system is strictly a follow-up system in which the rudder angles depend upon the location of the craft with respect to a control transmitter; and, in which the rudder angle must decrease continuously as the craft approaches the "no-drift" course through the said transmitter, and must become zero when the craft arrives at or moves along such course. Where only one transmitter is used, it is obvious that this "no-drift" course lies in the direction opposite to the direction of the wind or current causing the drift.

It is believed that the operation and many advantages of the system will be apparent to persons skilled in the military and navigational arts without further elaboration.

What I claim is:

1. A steering and position indicating system comprising three transmitters of different frequencies spaced apart at known distances from each other to form a triangle, a dirigible craft having steering means, three radio receivers on said craft adapted to be tuned to the frequencies of any of said transmitters, each receiver including a directional antenna rotatable about a normally vertical axis and a sense antenna and being tuned to a frequency different from the frequencies to which the other receivers are tuned, a reversible motor operably controlled by the output of one of said receivers and connected to the directional antenna of that receiver to turn and hold said directional antenna trained on the transmitter to the frequency of which said receiver is tuned, a reversible motor operably controlled by the output of another of said three receivers and connected to the directional antenna of that other receiver to turn and hold the directional antenna thereof trained on the transmitter to the frequency of which that other receiver is tuned, differential gearing connecting said motors to said steering means to steer said craft from any direction on to and in drift-corrected movement along a straight course passing through the two transmitters on which the said two directional antennas are held trained by said motors and in a direction along said course determined by the transmitter frequencies to which the respective receivers are tuned, a third reversible motor controlled by the output of the remaining receiver and connected to the directional antenna of that remaining receiver to turn and hold the directional antenna thereof trained on the remaining transmitter, and means operably controlled by all three of said motors for indicating the directions of the three transmitters from said craft.

2. The system set forth in claim 1 in which said indicating means comprises three concentrically rotatable pointers maintained constantly in the same angular relation to each other as the angular relation between vertical planes passing through said craft and transmitters.

3. The system set forth in claim 1 in which said indicating means comprises a dial controlled by one of the two first-named motors to rotate about an axis on said craft and having an indicator extending radially thereon, a second indicator controlled by the other of the two first-named motors to rotate about said axis to aline with the dial indicator only when the craft is on said course, and a third indicator controlled by the remaining motor to rotate about said axis, said dial being provided with a scale cooperating with the third indicator to indicate the position of the craft on said course only when the first named indicators are alined with each other.

4. A steering system comprising two radio transmitters of different frequencies spaced apart to define a course; a dirigible craft having a rudder normally alined with the fore-and-aft axis of the craft; mechanism for operating said rudder; two radio receivers adapted to be tuned to the frequency of either transmitter but each tuned to the frequency of only one of said transmitters; each receiver including a directional antenna rotatable about a normally vertical axis and a sense antenna; a reversible motor operably controlled by the output of one of said receivers and connected to the directional antenna thereof to turn and hold the same trained on the transmitter to which the said receiver is tuned; a reversible motor operably controlled by the output of the other receiver and connected to the directional antenna of that other receiver to turn and hold the last named antenna trained on the other transmitter; means including differential gearing connecting said motors to said mechanism to turn the rudder, responsive to "off course" condition of the craft, in the direction required to steer the craft on to and in drift corrected movement along said course, and to maintain the rudder inclined to said fore-and-aft axis at an angle proportional to the difference between the exterior and interior opposite angles at the base of the triangle formed with said course by straight lines drawn to the craft from said transmitters when the craft is located outside the zone lying between said transmitters and bounded by vertical planes perpendicular to said course and passing through said transmitters, the direction of movement of the craft along said course being determined by the transmitter frequencies to which the respective receivers are tuned.

5. The herein described method of automatically steering a dirigible vehicle from any location on to and along a straight course passing through two spaced apart sources of radiant energy, which comprises receiving energies on said vehicle from said sources, establishing by said received energies two lines of direction from the vehicle to said sources, and controlling in accordance with such received energies automatically the steering of the vehicle to effect and maintain substantial coincidence between said lines.

6. The herein described method of automatically steering a dirigible vehicle from any location on to and along a straight course passing through two spaced apart sources of radiant energy, which comprises: receiving energies on said vehicle from said sources; establishing, by said received energies, two lines of direction from the vehicle to said sources; measuring the angle at the apex of the triangle formed with said course by said lines; and controlling in accordance with such measurement automatically the steering of the vehicle on to and along said course toward or away from both of said sources of radiant energy.

7. The herein described method of automatically steering a dirigible vehicle from any location on to and along a straight course passing through two spaced apart sources of radiant energy, which comprises; receiving energies in said vehicle from said sources; establishing, by said received energies, two lines of direction from the vehicle to said sources; measuring the supplement of the angle at the apex of the triangle formed with said course by said lines; and controlling in accordance with such measurement automatically the steering of the vehicle on to and along said course between said sources of energy.

8. A steering system comprising: a radio transmitter; a dirigible craft having a rudder; a radio receiver tuned to the frequency of said transmitter, and including a directional antenna rotatable freely about a normally vertical axis on said craft; a follow-up motor operably controlled by the output of said receiver; means connecting said motor to said directional antenna to turn and hold said directional antenna trained on said transmitter throughout, and independently of, the turnings in azimuth of said craft; and means directly connecting said motor to said rudder, whereby said motor itself causes said rudder to steer said craft from any direction to said transmitter.

9. A steering system comprising; a radio transmitter; a dirigible craft having a rudder; a radio receiver tuned to the frequency of said transmitter, and including a directional antenna rotatable freely about a normally vertical axis on said craft; a follow-up motor operably controlled by the output of said receiver; means connecting said motor to said directional antenna to turn and hold said directional antenna trained on said transmitter throughout, and independently of, the turnings in azimuth of said craft; means directly connecting said motor to said rudder, whereby said motor itself causes said rudder to steer the craft from any direction to said transmitter; a source of supply of energy for operating said motor; and means connected to said directional antenna and operable by the rotation thereof through any angle greater than a selected predetermined angle for disconnecting said source of supply from said motor.

10. A steering system comprising; two radio transmitters of different frequencies spaced apart to define a course; a dirigible craft having a rudder normally alined with the fore-and-aft axis of the craft; mechanism for operating said rudder; two radio receivers adapted to be tuned to the frequency of either transmitter but each tuned to the frequency of only one of said transmitters; each receiver including a directional antenna rotatable about a normally vertical axis on said craft and a sense antenna; a reversible motor operably controlled by the output of one of said receivers and connected to the directional antenna thereof to turn and hold the same trained on the transmitter to which its said receiver is tuned; a reversible motor operably controlled by the output of the other receiver and connected to the directional antenna of that other receiver to turn and hold the last named antenna trained on the other transmitter; means including differential gearing connecting said motors to said mechanism to turn the rudder, responsive to "off course" condition of the craft, in the direction required to steer the craft on to and in drift-corrected movement along said course, and to maintain the rudder inclined to said fore-and-aft axis at an angle proportional to the sum of the interior angles at the base of the triangle formed with said course by straight lines drawn to the craft from said transmitters when the craft is located in the zone lying between said transmitters and bounded by vertical planes perpendicular to said course and passing through said transmitters, the direction of movement of the craft along said course being determined by the transmitter frequencies to which the respective receivers are tuned.

11. The system set forth in claim 1 in combination with a circuit including electrically controlled mechanism, a source of electrical energy supply for said mechanism, and settable means cooperating with said indicating means to form a switch controlling the application of said energy supply to said mechanism at any position on said course predetermined by the setting of said settable means.

12. In a radio controlled steering system; three radio transmitters of different frequencies spaced apart at known distances from each other to form a triangle; a dirigible craft; three automatic radio compasses mounted on said craft, each tuned to a different frequency and responsive only to a particular one of said transmitters; each compass including a directional antenna rotatable about a normally vertical axis on said craft and means controlled by energy derived from said transmitters for holding said antenna trained on any of the three transmitters to which its compass is tuned; and, mechanism operably connected to said means for steering said craft on to and in drift-corrected movement in a predetermined direction along a straight course passing through any selected two of said three transmitters and for continuously indicating the position of the craft on the selected course.

13. The combination with the system set forth in Claim 12 of a normally open electrical circuit on said craft, and a switch adjustable on the position indicating part of said mechanism to control the closing of said circuit at any predetermined position of the craft on the course selected.

14. In a radio controlled steering system: three radio transmitters of different frequencies spaced apart at known distances from each other to form a triangle; a dirigible craft; three automatic radio compasses mounted on said craft, each tuned to a different frequency and responsive only to a particular one of said transmitters; each compass including a directional antenna rotatable about a normally vertical axis on said craft and means controlled by energy derived from said transmitters for holding said antenna trained on any of the three transmitters to which its compass is tuned; and, mechanism operably connected to said means for steering said craft on to and in drift-corrected movement in a predetermined direction along a straight course passing through any selected two of said three transmitters and for continuously indicating the position of the craft on the selected course; the indicating part of said mechanism comprising a dial rotatable about a fixed axis and having a position indicating scale thereon and being formed of insulating material; conducting contacts electrically connected to each other and fixed at diametrically opposite points on said dial; a conducting indicator arm rotatable about said axis and adapted to make wiping contact with either of said fixed contacts; a conducting contact angularly adjustable on said dial; a second conducting arm in conducting contact with the first named arm and mounted to rotate over said dial to make wiping contact with said angularly adjustable contact; electrically controlled mechanism on said craft; a source of supply of electrical energy for said mechanism; and a normally open circuit including said source of supply and said mechanism, said circuit being closed only by the simultaneous contact of the first named conducting arm with either of said fixed contacts and of the second named arm with the adjustable contact.

JOSEPH DUGAN.